United States Patent [19]
Schipfer et al.

[11] Patent Number: 4,788,234
[45] Date of Patent: Nov. 29, 1988

[54] CATALYZED CATIONIC PAINT BINDERS

[75] Inventors: Rudolf Schipfer; Wolfgang Daimer; Gerhard Schmölzer, all of Graz, Austria

[73] Assignee: Vianova Kunstharz, A.G., Werndorf, Austria

[21] Appl. No.: 109,521

[22] Filed: Oct. 19, 1987

[51] Int. Cl.$^4$ ............................................. C08L 63/00
[52] U.S. Cl. ................... 523/402; 204/181.7; 523/414; 528/92; 525/61; 525/523; 525/533
[58] Field of Search ............... 523/402, 414; 525/533, 525/523, 61; 528/92; 204/181.7

[56] References Cited

U.S. PATENT DOCUMENTS

| | | | |
|---|---|---|---|
| 4,405,662 | 9/1983 | Raudenbusch et al. | 528/291 X |
| 4,440,612 | 4/1984 | Valko | 523/414 X |
| 4,458,054 | 7/1984 | Schmözer et al. | 528/183 X |
| 4,459,393 | 7/1984 | Barnhoorn et al. | 523/414 X |
| 4,491,611 | 1/1985 | Barnhoorn et al. | 523/414 X |
| 4,523,007 | 6/1985 | Schipfer et al. | 528/243 X |
| 4,544,715 | 10/1985 | Paar et al. | 528/73 X |
| 4,557,976 | 12/1985 | Geist et al. | 525/438 X |
| 4,659,800 | 4/1987 | Daimer et al. | 528/103 |
| 4,713,406 | 12/1987 | Schupp et al. | 528/341 X |
| 4,742,096 | 5/1988 | Craun | 528/93 X |

*Primary Examiner*—Earl Nielsen
*Attorney, Agent, or Firm*—A. W. Breiner

[57] ABSTRACT

Cationic paint binders, particularly binders of the type used in cathodic electrodeposition coatings which crosslink through transesterification, transamidation, transurethanization, or through the reaction of chain end double bonds catalyzed with a reaction product of lead(II) oxide with compounds carrying β-hydroxyamino structure are described. The catalysts of the invention provide very good stability and good compatibility in aqueous cationic paint materials.

16 Claims, No Drawings

CATALYZED CATIONIC PAINT BINDERS

FIELD OF INVENTION AND BACKGROUND

The invention is concerned with a process for catalyzing cationic paint binders. More particularly, the invention relates to catalyzed paint binders of the type used in cathodic electrodeposition coatings.

Cathodically depositable electrodeposition paints essentially are crosslinked at elevated temperature through transesterification, transamidation, transurethanization, or through the reaction of chain end double bonds. It is known that crosslinking reactions of this type are catalyzed with metal compounds. In practically all cases, catalysis for the curing of cathodically depositable paint films is necessary to achieve the performance required for commercial applications. One of the more important catalysts used in practice are compounds of lead II, used either as lead(II) oxide or in the form of its salts with longer chain fatty acids (naphthenic acid, octanoic acid), as well as with acids forming water-soluble salts (formic acid, acetic acid, lactic acid, etc.) or as a pigment (basic lead silicate) forming, partially at least, a water-soluble salt through reaction with the acid neutralizing the cathodic binder. All catalysts presently used for this purpose, however, lead to essential disadvantages in cathodically deposited electrodeposition paints.

The lead compounds which are solid substances (lead oxide or basic lead silicate) dissolve only in the paint. Thus, the paints have to be homogenized for substantial periods to achieve the effectivity of the lead salt as a catalyst. The water-soluble salts which form—as well as other water-soluble salts directly added to the paint—in their essential part are not in the resin micelle, but rather are in the aqueous phase of the paint. On electrodeposition they are washed out by the electrical endosmosis in the film causing dewatering of the film, or they are deposited on the substrate as metal precipitate. Furthermore, portions of the dissolved salts are removed from the paint bath due to the dialysis installations in electrodeposition plants and, where a rinsing process is used, are carried back into the tank without adequate control. The water-insoluble salts of longer chain fatty acids are soluble in the resin and, thus, substantially remain in the resin micelle. Through hydrolysis, however, titratable quantities of water-insoluble fatty acids form, which essentially disturb the deposition behavior and the control of the paint bath on electrodeposition.

According to EP-A1 No. 00 82 214, attempts were made to fix the catalytically effective metals by reaction with a tertiary amino group and hydroxy group containing binder. However, such reactions require temperatures of from about 100° C. to 150° C. which will bring about crosslinking of the reactive resin types presently preferred. Furthermore, for the procedure suggested, the resin must contain a relatively high level of organic solvents. This complicates the formulation of paint baths with low-solvent content, i.e., low-VOC or low volatile organic composition types, to a substantial extent.

SUMMARY OF INVENTION

It has now been found that the above-noted disadvantages can be avoided when the reaction products of lead(II) oxide with components carrying β-hydroxyamino structures are used as the catalyst.

Thus, the present invention is primarily concerned with catalyzed cationic paint binders which are crosslinkable through transesterification and/or transamidation and/or transurethanization, and/or reaction of chain end double bonds wherein the catalyst is a reaction product of lead(II) oxide with a compound carrying β-hydroxyamino structure. The invention is further concerned with the process of catalyzing cationic paint materials with a reaction product of lead(II) oxide and a compound carrying β-hydroxyamino structure which can be added to the cationic paint at any stage of the paint preparation or during application, particularly with electrodeposition materials (CED-baths).

The catalysts used according to the present invention are compatible even when stored cold with various cationic materials including condensation resins, polymerization resins, and polyaddition resins. The organophilic molecule segments of the catalysts enable them to stay in the resin phase and thus also, through endosmosis, in the substantially dewatered film. On storage or in the electrodeposition bath, no detrimental hydrolytic splitting occurs. The split-off products which may occur on stoving are volatile and ecologically harmless.

GENERAL DESCRIPTION OF INVENTION AND PREFERRED EMBODIMENTS

The lead compounds used as catalysts in the present invention result from the reaction of lead(II) oxide with compounds carrying β-hydroxyamino structures, with the separation of water. A proposed reaction scheme is

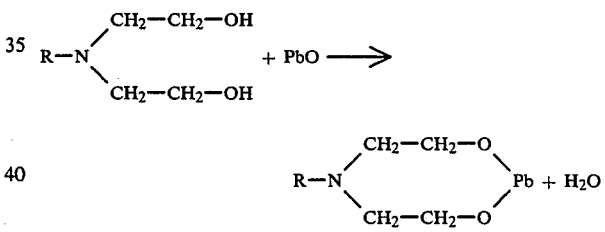

wherein R can be a hydrogen atom, an alkyl or alkanol radical, or the radical of a higher molecular compound. The reaction products, which can be in crystalline form, are dilutable with water upon partial or total neutralization of their basic groups.

Suitable β-hydroxyamino functional compounds are primary, secondary or tertiary β-hydroxyalkylamines, such as monoethanolamine, diethanolamine, or triethanolamine and the corresponding isopropanol amines; (cyclo)alkylalkanol amines; N-phenylalkanolamines; N-amino-alkyl-N-alkanolamines; 2-aminoalkanols; 2-aminoalkane diols, and heterocyclic compounds, such as N-hydroxyethylpiperazine, and the like. It is essential that the compound carry a β-hydroxyamino structure which will react with PbO to split out water. The preferred compounds are where R is a higher molecular radical. Examples of such compounds are the reaction products of compounds containing glycidyl groups with secondary mono-alkanolamines or, preferably, with secondary dialkanolamines. In such case R can stem from mono- or diepoxy compounds as are contained in the available epoxy resins having an epoxy equivalent weight of up to about 1000. R can also be the radical of a low molecular glycidyl group containing (co)polymer. Particularly preferred compounds are the reaction products of bisphenol-A epoxy resins based on bisphenol-A and epichlorohydrin and diethanolamine. The hydroxy groups of these compounds can be totally or partially reacted with the lead oxide.

The catalyst compounds according to the present invention are prepared through reaction of the compound carrying the β-hydroxyamino structure, i.e., an alkanolamine with the lead oxide at from 70° to 110° C. The reaction can be carried out in the solid state or in the presence of solvents, such as glycolethers or ketones. Mainly with higher molecular reaction pairs, the use of solvents is necessary or advantageous. The reaction water can optionally be removed from the reaction batch through azeotropic distillation with an entraining agent, such as an aliphatic hydrocarbon with a boiling range of from about 80° C. to 120° C.

The catalyst compounds used according to the present invention can be added to the paint material at any point during the preparation of the paint. They can be added in concentrated form to a binder, to an optionally used pigment grinding resin or to the pigment paste, whereby optionally, protonation can be effected together with the binder. Also, the compounds can be added in neutralized form and diluted with water and/or auxiliary solvents. On electrodeposition, the diluted aqueous solution can also be added to the bath materials in operation.

The catalyst compounds according to the present invention are used in a quantity such that the paint, calculated on binder solids, contains from 0.1% to 3.0%, preferably 1.0% to 2.0%, of lead (calculated as metal).

The catalysts of the present invention can be used with any of the known and commercially available cationic paint binders which are crosslinkable through transesterification and/or transamidation and/or transurethanization and/or reaction of chain end double bonds. The catalysts are particularly effective when used in cathodic electrodeposition systems.

The following examples illustrate the invention without limiting its scope. All parts or percentages refer to weight unless otherwise stated. The following abbreviations are used in the examples:

| | |
|---|---|
| AEPD | 2-amino-2-ethyl-propanediol-1,3 |
| CE | Glycidylester of $C_9$-$C_{11}$-tert.-monocarboxylic acids |
| DEAPA | Diethylaminopropylamine |
| DIPA | Diisopropanolamine |
| DMF | Dimethylformamide |
| DOLA | Diethanolamine |
| EGL | Ethyleneglycolmonoethylether |
| EPH I | Bisphenol-A diglycidylether (Epoxy equivalent about 190) |
| EPH II | Polyglycoldiglycidylether (Epoxy equivalent about 200) |
| EPH III | Bisphenol-A epoxy resin based on bisphenol-A and epichlorohydrin (Epoxy equivalent about 475) |
| FH | Resin solids |
| MDE | Malonic acid diethylester |
| MEOLA | Monoethanolamine |
| PG | Propyleneglycol-1,2 |
| PM | Propyleneglycolmonomethylether (Methoxypropanol) |
| TROLA | Triethanolamine |
| MDM | Malonic acid dimethylester |
| Val | Equivalent weight in grams for the designated functional group and, accordingly, is equivalent to groups. |
| MEQ-value. | Milliequivalents of unreacted epoxide groups and milliequivalents of amine groups per gram of sample (solids). |

(A) Preparation Of Lead Catalyst Compounds

Various lead catalyst compounds are prepared according to the data set forth in Table 1. Low molecular weight alkanolamines are reacted with lead(II) oxide without co-employment of solvents. The crystalline compounds formed are filtered and washed with ethanol.

When using an epoxy-amine adduct as the β-hydroxyamino compounds, the epoxy resin is first reacted with the alkanolamine, at about 60° C., in the presence of a solvent, preferably methoxypropanol or a similar glycolether. After the consumption of all epoxy groups, the lead oxide is added in portions at the temperature listed in Table 1. The next portion is added when the preceding portion has dissolved.

Catalyst compound K-10 is prepared in a manner such that the epoxy resin is dissolved in PM and reacted at 60° C. with DOLA, until an MEQ-value of 3.3 is attained. Then, at 60° C., AEPD is added and the reaction is carried to an MEQ-value of 2.25. Addition and reaction with the lead oxide are carried out in the manner described above.

Catalyst compounds K-4, K-6 and K-7 are dilutable with water to provide a clear solution upon addition of 40 millimoles acetic acid per 100 g resin solids. K-10 provides a clear solution after addition of 80 millimoles acetic acid per 100 g resin solids.

Table 1 is as follows:

TABLE 1

(The Quantities of Reactants Are Given In Moles)

| Catalyst Compound | Alkanolamine | | | | Glycidyl Compound | | | | MP[(1)] % | PbO | Reaction Conditions Hours/Temp. °C. |
|---|---|---|---|---|---|---|---|---|---|---|---|
| | TROLA | DOLA | DIPA | AEPD | CE | EPH I | EPH II | EPH III | | | |
| K-1 | 1 | — | — | — | — | — | — | — | — | 1 | 1/60 |
| K-2 | — | 1 | — | — | — | — | — | — | — | 1 | 4/90 |
| K-3 | — | — | 1 | — | — | — | — | — | — | 1 | 4/90 |
| K-4 | — | 2 | — | — | 1 | — | — | — | 60 | 1 | 6/100 |
| K-5 | — | 2 | — | — | 1 | — | — | — | 60 | 2 | 6/120 |
| K-6 | — | — | 2 | — | 1 | — | — | — | 60 | 1 | 6/100 |
| K-7 | — | 2 | — | — | — | 1 | — | — | 70 | 1 | 6/100 |
| K-8 | — | 2 | — | — | — | — | — | 1 | 60 | 1 | 5/120 |
| K-9 | — | 1 | — | — | 1 | — | — | — | 70 | 1 | 6/100 |
| K-10 | — | 2 | — | 1 | — | 2 | — | — | 70 | 1 | 4/120 |

[(1)]The quantity of the solvent (methoxypropanol) refers to the solids content of the resulting final product.

(B) Preparation And Evaluation Of The Catalyzed Paint Systems

In the following Examples 1 to 16, paint systems are prepared with binders which cure through transesterification. Examples 1 and 6 are comparison examples using lead octoate as catalyst according to the state of the art. The compositions are listed in Table 2.

The catalyst compounds are incorporated into the paint systems using two alternative methods.

Method 1: Binder and catalyst compound, as 60% solution in an organic solvent, preferably a glycolether, such as PM, are homogeneously mixed at 40° C. After 24 hours the blend is applied to a glass plate at a wet film thickness of 30 μm and stoved for 30 minutes at the temperature given in Table 2 (140° C., 150° C., and 160° C.). The stoved films are compared using the acetone test.

Substantially the same results are obtained using Method 2, if the blends, after neutralization with 45 millimoles formic acid per 100 g resin solids, are diluted with deionized water to a solids content of 15% and cathodically deposited on degreased steel panels at a dry film thickness of 22±2 μm and stoved as above set forth.

Method 2: In this method binder solutions, after neutralization with formic acid, are diluted with deionized water to a solids content of 15%. To this clear varnish a catalyst compound neutralized with formic acid or acetic acid and diluted to 30% with deionized water is slowly added with stirring. After a period of 24 hours of homogenization, films are cathodically deposited on degreased steel panels at a dry film thickness of 22±2 μm and stoved for 30 minutes.

The following products were used as binders:
BM-1: Partial condensation product of Base Resin M-1 (70 parts) and crosslinking component S-1 (30 parts). The components were condensed at 120° C. for 2 hours.
BM-2: Partial condensation product of Base Resin M-2 (70 parts) and crosslinking component S-2 (30 parts). Condensation conditions: 2 hours/120° C.

The binder components are prepared in the following manner:

Base Resin M-1: 1627 g (3.43 Val) of an epoxy resin based on bisphenol-A and epichlorohydrin (epoxy equivalent weight about 475) are reacted at 110° C. to an acid value of below 5 mg KOH/g in an 85% solution in PM of 226 g (0.24 COOH-Val) of a polyester of 3 moles trimethylolpropane, 2 moles adipic acid, 1 mole isononanoic acid, and 1 mole tetrahydropthalic acid anhydride (acid value 65 mg KOH/g, carboxy equivalent 942 g).

After dilution of the batch with PM to a solids content of 70%, a blend of 94.5 g (0.9 Val) DOLA, 67.5 g (0.9 Val) MEOLA, 78 g (1.2 Val) DEAPA, and 240 g PM is added at 60° C. within 2 hours. The temperature then is raised to 90° C. and held for 1 hour. After addition of 5% by weight (calculated on the resin solids content of the batch) of polypropyleneglycol diglycidylether, the batch is reacted at 90° C. until all glycidyl groups have reacted. The product has an amine value of 76 mg KOH/g and a hydroxyl number (primary OH) of 89 mg KOH/g. The solids content is adjusted with PM to 70%.

Base Resin M-2: 190 g of bisphenol-A epoxy resin based on bisphenol-A and epichlorohydrin (1 epoxy equivalent) and 1425 g of a bisphenol-A epoxy resin based on bisphenol-A and epichlorohydrin (3 epoxy equivalents) are dissolved in 597 g EGL at 100° C. The solution is cooled to 60° C. and 126 g DOLA are added. The temperature is slowly raised to 80° C. within 2 hours. 169 g DEAPA are then added and the temperature is raised to 120° C. within 2 hours. At this temperature 478 g CE are added and the batch is held at 130° C. for 5 hours, while stirring. The batch is diluted to 65% resin solids with EGL. The resin (solids) has an amine value of 91 mg KOH/g and a hydroxyl value of 265 mg KOH/g.

Crosslinkinq Component S-1: In a suitable reaction vessel equipped for azeotropic distillation and a bubble tray for the separation of the alcohol component formed at the partial transesterification, to a blend of 1 mole MDM and the catalyst blend (each 0.5 to 1.0 moles, calculated on ester) of piperidine and formic acid, 0.5 moles formaldehyde, as paraformaldehyde, are added at 70° to 80° C. The reaction is exothermic, and the temperature is controlled so as not to surpass 90° C. The temperature is held until the formaldehyde has dissolved completely. The temperature is then slowly raised to 110° to 120° C., and the reaction water which is formed is removed from the reaction blend with a suitable entraining agent. After vacuum-stripping the entraining agent, 0.2 moles PG are added and the temperature is raised until distillation starts. The reaction is carried on until a refractive index n 20/D of 1.4632 and an intrinsic viscosity of 2.1 ml/g in DMF/20° C. is attained. The product has a solids content of about 95% (30 min./120° C.), a hydroxyl value of below 5 mg KOH/g, and an ester equivalent of 48.

Crosslinking Component S-2: As described for Crosslinking Component S-1, 1 mole MDE are reacted with 0.9 moles formaldehyde (as paraformaldehyde) and 0.3 moles PG to a refractive index of 1.4670 and an intrinsic viscosity in DMF/20° C. of 5.2 ml/g. The product has a solids content of about 94% (30 min./120° C.), a hydroxyl value of below 5 mg KOH/g, and an ester equivalent of 83.

The films prepared using the components of Table 2 were stoved at 140° C., 150° C. and 160° C., and then tested for acetone resistance by applying an acetone-soaked cotton swab. The time is recorded, after which the film can be damaged with a fingernail. The results are also listed in Table 2 as follows:

TABLE 2

| Example | Binder Combination | % Metal of Catalyst[1] | Catalyst | Processing Method | Acetone Resistance In Seconds With Stoving Temperature | | |
|---|---|---|---|---|---|---|---|
| | | | | | 140° C. | 150° C. | 160° C. |
| 1 (V) | BM-1 | 1 | lead octoate | 2 | 70 | 80 | 110 |
| 2 | BM-1 | 1 | K-4 | 2 | 100 | over 120 | over 120 |
| 3 | BM-2 | 1 | K-6 | 2 | 90 | over 120 | over 120 |
| 4 | BM-2 | 1 | K-7 | 2 | over 120 | over 120 | over 120 |
| 5 | BM-1 | 1 | K-10 | 2 | 80 | 110 | over 120 |
| 6 | BM-1 | 2 | lead octoate | 1 | 30 | 35 | 40 |
| 7 | BM-1 | 2 | K-1 | 1 | 50 | 60 | 70 |
| 8 | BM-1 | 2 | K-2 | 1 | 40 | 50 | 65 |
| 9 | BM-1 | 2 | K-3 | 1 | 40 | 50 | 60 |
| 10 | BM-1 | 2 | K-4 | 1 | 55 | 60 | 70 |

TABLE 2-continued

| Example | Binder Combination | % Metal of Catalyst[1] | Catalyst | Processing Method | Acetone Resistance In Seconds With Stoving Temperature | | |
|---|---|---|---|---|---|---|---|
| | | | | | 140° C. | 150° C. | 160° C. |
| 11 | BM-1 | 2 | K-5 | 1 | 60 | 65 | 65 |
| 12 | BM-2 | 2 | K-6 | 1 | 55 | 65 | 70 |
| 13 | BM-2 | 2 | K-7 | 1 | 50 | 60 | 60 |
| 14 | BM-2 | 2 | K-8 | 1 | 50 | 65 | 65 |
| 15 | BM-2 | 2 | K-9 | 1 | 40 | 50 | 55 |
| 16 | BM-2 | 2 | K-10 | 1 | 60 | 70 | 70 |

[1]The quantity of catalyst is given as % effective metal content on resin solids of binder.

As will be apparent to one skilled in the art, various modifications can be made within the scope of the aforesaid description. Such modifications being within the ability of one skilled in the art form a part of the present invention and are embraced by the appended claims.

It is claimed:

1. Process for catalyzing cationic paint binders crosslinkable through at least one of transesterification, transamidation, transurethanization, or reaction of chain end double bonds comprising adding to said binder, as a catalyst, the reaction product of lead(II) oxide with β-hydroxyamino structure carrying compounds.

2. The process according to claim 1 wherein the catalyst compound is homogenized with the binder prior to protonation and thereafter the components are jointly protonated and diluted with water.

3. The process according to claim 1 wherein the catalyst compound is protonated and diluted with water and thereafter added to a binder concentrate or to a diluted paint material.

4. The process according to claim 3 wherein the diluted catalyst compound is added to an electrodeposition paint in an electrodeposition bath in operation.

5. The process according to any one of claims 1-4 wherein the catalyst is the reaction product of lead(II) oxide with low molecular primary, secondary, or tertiary β-hydroxyamines.

6. The process according to any one of claims 1-4 wherein the catalyst is a reaction product of lead(II) oxide with adducts of secondary mono- or dialkanolamines and glycidyl group containing compounds.

7. The process according to any one of claim 1-4 wherein the catalyst is a reaction product of lead(II) oxide with adducts of dialkanolamines and bisphenol-A epoxy resins.

8. The process according to any of claims 1 to 7 wherein the β-positioned hydroxy groups of the amine compound are totally or partially reacted with lead(II) oxide.

9. Cationic paint binders crosslinkable through at least one of transesterification, transamidation, transurethanization, or reaction of chain end double bonds in combination with, as a catalyst, a reaction product of lead(II) oxide with β-hydroxyamino structure carrying compounds.

10. The cationic paint binder of claim 9 wherein the catalyst compound is homogenized with the binder prior to protonation and thereafter the components are jointly protonated and diluted with water.

11. The cationic paint binder of claim 9 wherein the catalyst compound is protonated and diluted with water and thereafter added to a binder concentrate or to a diluted paint material.

12. The cationic paint binder of claim 11 wherein the diluted catalyst compound is added to an electrodeposition paint in an electrodeposition bath in operation.

13. The cationic paint binder of any one of claims 9–12 wherein the catalyst is the reaction product of lead(II) oxide with low molecular primary, secondary, or tertiary β-hydroxyamines.

14. The cationic paint binder of any one of claims 9–12 wherein the catalyst is a reaction product of lead(II) oxide with adducts of secondary mono- or dialkanolamines and glycidyl group containing compounds.

15. The cationic paint binder of any one of claims 9–12 wherein the catalyst is a reaction product of lead(II) oxide with adducts of dialkanolamines and bisphenol-A epoxy resins.

16. The cationic paint binder of any one of claims 9 to 15 wherein the β-positioned hydroxy groups of the amine compound are totally or partially reacted with lead(II) oxide.

* * * * *